March 24, 1970     R. L. CAIN ET AL     3,502,790
WEATHER-INSULATING SHEATH FOR TV CABLE CONNECTORS
Filed March 20, 1968
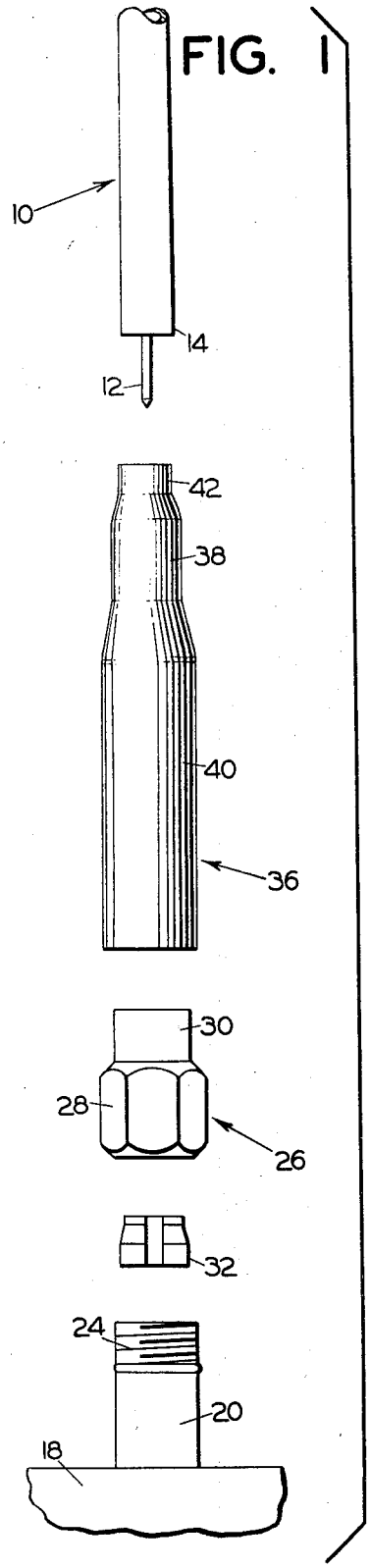
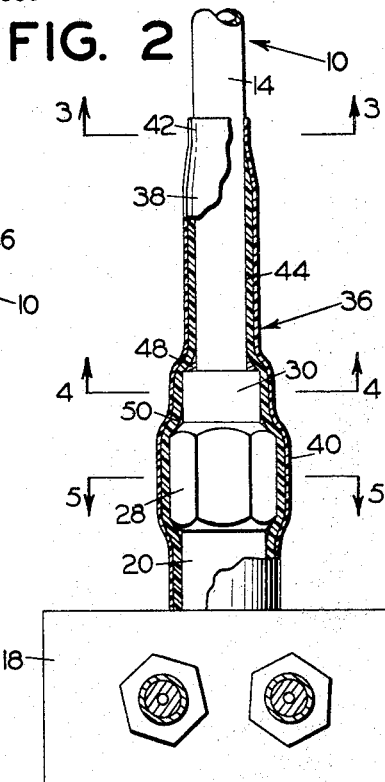
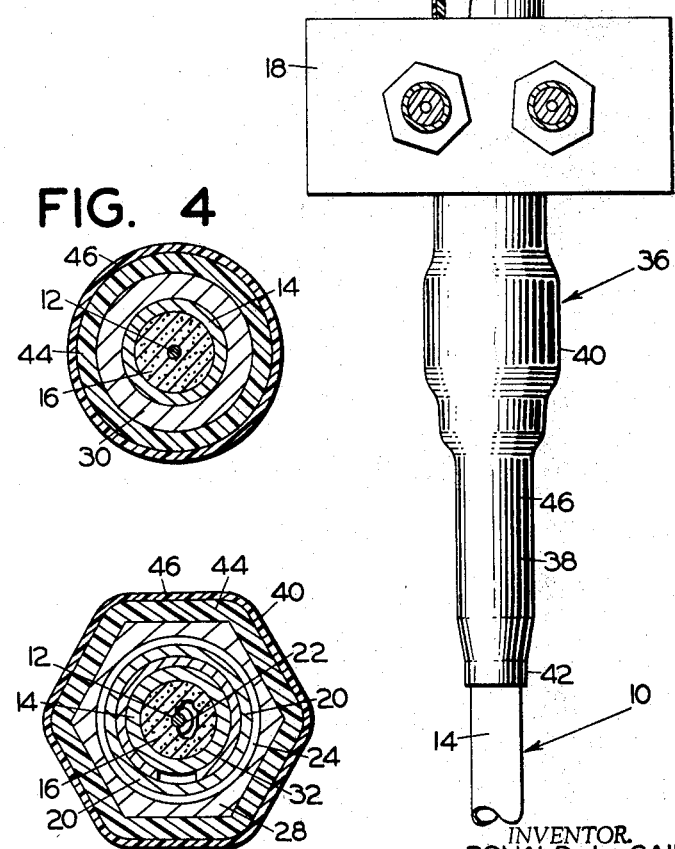
INVENTOR.
RONALD L. CAIN
KENNETH G. JONES
BY
ATTY.

United States Patent Office 3,502,790
Patented Mar. 24, 1970

3,502,790
WEATHER-INSULATING SHEATH FOR TV CABLE CONNECTORS
Ronald L. Cain, 8210 Steilacoom Blvd. SW., Tacoma, Wash. 98498, and Kenneth G. Jones, San Jose, Calif. (930 San Tomas Aquino Road, Campbell, Calif. 95008)
Filed Mar. 20, 1968, Ser. No. 714,639
Int. Cl. H01b 17/00
U.S. Cl. 174—138    2 Claims

ABSTRACT OF THE DISCLOSURE

A weather-insulating sheath for TV cable connectors comprises a continuous, laminated tube having an inner layer of pliant, natural rubber and bonded thereto a restraining outer layer of neoprene.

---

This invention relates to weather-insulating sheaths for TV cable connectors.

The problem solved by the present invention best may be discussed with reference to the drawings, wherein:

FIG. 1 is an exploded view of a cable TV assembly including the insulating sheath of the present invention;

FIG. 2 is an assembled view of the TV cable assembly of FIG. 1; and

FIGS. 3, 4 and 5 are transverse sectional views taken along lines 3—3, 4—4 and 5—5, respectively, of FIG. 2.

In the installation of TV cable assemblies, there are many situations in which the cable is coupled to an electrical appliance in an out-of-doors environment in which the resulting coupling is subject to the attack of atmospheric elements. Such an installation is illustrated in FIGS. 1 and 2.

In the installation of those figures, the TV cable, indicated generally at 10, comprises an inner wire 12 of copper, contained in an aluminum ground conductor 14 and in an intermediate layer 16 of Styrofoam or other suitable electrical insulation material.

The electric current passes through conductor 12 to appliance 18, which may be a directional tap, an amplifier, a splicer, a splitter, or the like. The appliance is fitted with an outwardly extending conduit 20 which receives and houses a conducting socket 22 dimensioned to receive in frictional engagement the protruding end of copper conductor 12. The conduit is arranged concentrically with socket 22 and is shaped with a terminal threaded section 24.

In coupling cable 10 to electrical appliance 18, the end of the cable is inserted into conduit 20, with the outwardly projecting end of wire 12 plugged into socket 22 and the end of aluminum ground conductor 14 nesting within the threaded section 24 of the conduit.

To couple the elements together and hold them releasably secured to each other, there is provided a ground clamping connector 26 having an enlarged, internally threaded section 28, which threads to section 24 of the conduit, and a neck 30 of restricted cross section, which overlies ground section 14 of the TV cable, in sliding engagement therewith. A flared, split ground clamp ring 32 completes the assembly.

To assemble these elements, ground clamping connector 26 and ground clamp ring 32 are slipped over TV cable 10. The end of the latter is inserted into conduit 20. Outwardly projecting copper wire 12 is inserted into socket 22.

Clamped connector 28 and split ring 32 then are slipped into position and the former threaded onto the threaded section 24 of conduit 20. Tightening down on ground clamping connector 26 contacts ring 32 and wedges it into position in such a manner that an effective electrical connection is made. Also, TV cable 10 is secured to appliance 18 until such time as it is desired to uncouple it by releasing clamp 26.

So much of the herein described assembly is conventional. However, during use in out-of-door and other installations the assembly is particularly susceptible to the corrosive action of the elements. As a result of contact with atmospheric moisture in an oxidative environment, corrosion of the components occurs to such an extent as to interfere with the completion of the electrical circuit. This result is augmented by the presence of condensed moisture which may be produced or trapped in the various cavities present in the assembly.

The present invention provides a sheath which completely overcomes the foregoing problem. In essence, the sheath comprises a continuous tube having a section of enlarged cross section dimensioned to fit snugly over the coupling, and a section of diminished cross section, dimensioned to fit snugly over the TV cable. The tube has a laminar construction including an inner layer of pliant, insulating material such as natural rubber and bonded thereto a restraining outer layer of insulating material of limited elasticity, such as neoprene. Once in place the tube encloses the joint snugly and prevents penetration of corrosive atmospheric elements, either by direct external contact or by internal condensation of moisture.

The construction of the presently described weather-insulating sheath is shown particularly in FIGS. 1 and 2.

The sheath is indicated generally by the numeral 36. It is formed in three sections.

The intermediate section 38 comprises a tube having a cross sectional area fitting snugly on the exterior surface of cable 10. One terminal section 40 is of enlarged diameter as required to fit around ground clamp connector 26. Its end is squared so that it will abut squarely against the flat, adjacent surface of electrical appliance 18. The other terminal section 42 is of even smaller cross sectional area than is intermediate section 38. It grips tightly the exterior surface of cable 10.

To achieve the purposes of the invention, it is necessary that tube 36 have a laminar construction. As is particularly evident in FIG. 2, it comprises an inner layer 44 of pliant natural rubber and bonded thereto an outer layer 46 of neoprene.

Inner layer 44 of natural rubber is of substantial thickness. It is pliant and conforms readily to the contour of the fittings which it encloses. It provides the necessary body and also furnishes the required insulation. However, it is relatively susceptible to deformation with time and under stress. It also is relatively susceptible to the degradative action of atmospheric elements.

Accordingly, outer layer 46 of neoprene serves two important functions. First, since it is not readily subject to deformation, it contains the inner layer of natural rubber and holds it in shape over a long service life. Secondly, since it is chemically inert, it resists the action of atmospheric agents and protects the inner layer of natural rubber.

Advantage is taken of these properties of neoprene by making the outer neoprene layer longer than the inner natural rubber layer. This provides the neck or extension 42 referred to above. It closes off the raw outer edge of the inner natural rubber layer so that it cannot be attacked by the elements. The raw inner edge abuts against the flat surface of the electrical appliance 18 so that, with the assistance of various sealing compounds it too is protected.

The insulating sheath of the invention is easily applied. First, its inner surface is coated with a silicone lubricant which also may be applied in small amount to the exterior surface of TV cable 10. The sheath is slipped over the cable, permitting about four inches of the end of the cable to protrude. Clamp 26 and ring 32 are slipped over the end of the cable. The end of the cable is inserted into conduit 20, with wire 18 inserted in socket 22.

Next clamp 26 is threaded on section 24 of the appliance ground to make the electrical connection. Sheath 30 then is slipped into the position of FIG. 2 where it completely surrounds the coupling.

The coupling thereupon is completely protected. The sheath bars all access of atmospheric agents. Neoprene section 42 caps over the outer raw end of the inner layer of natural rubber. Abutment of the inner end of the sheath against the flat surface of appliance 18 seals off the inner raw edge of the natural rubber inner layer. Any cavities which may be present, e.g. cavities 48, 50, which owe their existence to the stepped configuration of the coupling, are completely filled with surplus silicone. This prevents the formation of condensation moisture which would be a further corrosive factor.

In this manner there is provided an insulating sheath which is easily applied and removed, but which achieves the purpose of sealing efficiently the coupling of a TV cable to directional tap or other electrical unit over a long service life under severe atmospheric conditions.

It is to be understood that the forms of our invention herein shown and described are to be taken as illustrative examples of the same and that various changes in the shape, size and arrangement of parts may be resorted to without departing from the spirit of our invention.

Having thus described our invention, we claim:

1. A weather-insulating sheath for TV cable connectors including a length of TV cable coupled to an electrical appliance through a coupling having a greater cross sectional area than that of the cable, the sheath comprising:
   (a) a continuous tube having a section of enlarged cross sectional area dimenionsed to fit snugly over the coupling and a section of diminished cross sectional area dimensioned to fit snugly over the TV cable,
   (b) the tube having a laminar construction including
       (1) an inner layer of pliant, insulating material adapted to conform substantially to the outer surface configuration of the connector components, and
       (2) a restraining outer layer of insulating material bonded to the inner layer and having limited elasticity and lesser thickness than the inner layer,
       (3) the outer layer extending beyond the inner layer at the section of diminished cross sectional area.

2. The sheath of claim 1 wherein the outer layer comprises neoprene and the inner layer comprises natural rubber.

References Cited
UNITED STATES PATENTS

| | | | |
|---|---|---|---|
| 2,583,804 | 1/1952 | Andrus | 174—74.1 XR |
| 3,009,986 | 11/1961 | Stephens | 174—84.1 |
| 3,054,847 | 9/1962 | Colbert | 174—93 XR |

DARRELL L. CLAY, Primary Examiner

U.S. Cl. X.R.

174—75, 77